No. 721,405. PATENTED FEB. 24, 1903.
W. M. WHEILDON.
COMPUTING DEVICE.
APPLICATION FILED JULY 28, 1902.
NO MODEL.
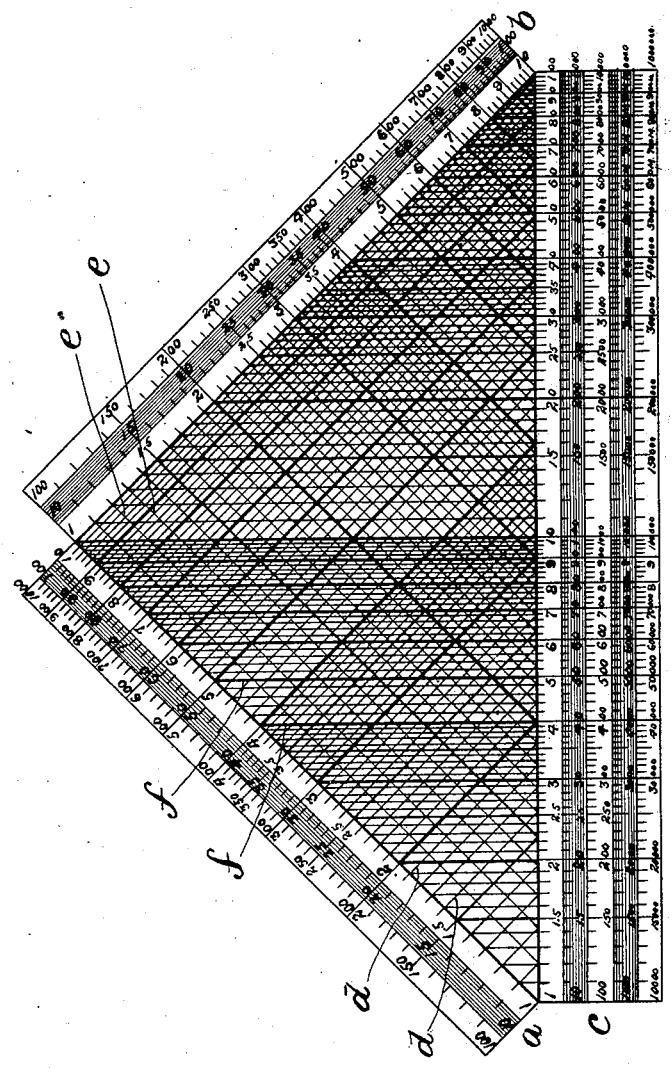

UNITED STATES PATENT OFFICE.

WILLIAM MAXWELL WHEILDON, OF BOSTON, MASSACHUSETTS.

COMPUTING DEVICE.

SPECIFICATION forming part of Letters Patent No. 721,405, dated February 24, 1903.

Application filed July 28, 1902. Serial No. 117,237. (No model.)

*To all whom it may concern:*

Be it known that I, WILLIAM MAXWELL WHEILDON, of Boston, in the county of Suffolk and State of Massachusetts, have invented certain new and useful Improvements in Computing Devices, of which the following is a specification.

This invention relates to computing devices for quickly and easily performing multiplications, divisions, proportions, powers, roots, &c., by the use of logarithmic scales. The principle of the logarithmic scale has become familiar in the device known as the "slide-rule;" but this device requires a manipulation or setting of the slide for each calculation.

My invention has for its object to avoid the necessity for setting a slide and other objections incident to the slide-rule; and to this end it consists in a plurality of primary logarithmic scales and a resultant logarithmic scale, together with intersecting lines or leaders extending from the divisions of the primary scales and other lines extending from the several intersections to the divisions of the resultant scale, all as hereinafter described and claimed. I am thereby enabled to dispense with moving parts and obtain direct readings for all computations performed by the device.

The accompanying drawing represents a plan view of a computing device constructed in accordance with my invention.

*a* and *b* represent two logarithmic scales forming two sides of a right-angle triangle, and *c* represents a third scale forming the hypotenuse of said triangle. Considering the innermost row or zone of each scale, it will be noted that the scales *a* and *b* are laid out with the numerals from "1" to "10" beginning at the left and reading to the right, while the scale *c* is laid out with the numerals from "1" to "100" reading from left to right. For convenience I term the scales *a* and *b* "primary scales" and the scale *c* a "resultant scale." Each of the scales is laid out logarithmically—that is to say, the numbers "1 2 3," &c., on each scale and all of the subdivisions of said numbers are laid out on the scale at distances from the left-hand starting-point corresponding to the logarithms of the numbers, the same as in the slide-rule. From the several divisions of the scale *a* a series of lines *d d* are run parallel to the scale *b* and extending to the scale *c*, and another series of lines *e e* are run from the several divisions of the scale *b* parallel to the scale *a* and extending to the scale *c*. From the several intersections of the diagonal lines *d e* vertical lines *f f* are run to the products on the scale *c* of the factors on the scales *a* and *b*. Thus from the intersection of the "3" line of scale *a* with the "2" line of scale *b* a vertical line extends to the division on the scale *c* marked "6," which is the product of two and three. The line from any division on the scale *a* or the scale *b* also runs to its square on the scale *c*. Thus, for instance, it will be seen that the "5" line on both scales *a* and *b* runs to the division "25" on scale *c*, which numeral expresses the square of five, and so on.

I will now indicate the manner of using the device for the principal computations. Multiplications are performed by taking one of the factors in each of the scales *a b*, following the diagonals *b e* from such factors until they intersect and following the vertical line *f* from their intersection to the result on the scale *c*. Thus to obtain the product of 1.5 and 1.2 follow the line *d* leading from "1.5" on the *a* scale until it meets the line *e* leading from the division "1.2" on the *b* scale and from their intersection follow the vertical line *f* to the division "1.8" on the *c* scale, which is the product of the two factors. Since division is the inverse of multiplication, the dividend is taken in the *c* scale, its vertical line followed until it intersects the diagonal line from the divisor in either the *a* scale or the *b* scale, and from this intersection a diagonal line will lead to the quotient in the other one of the last-said scales. Thus to divide twenty-one by three follow the vertical line *f* leading from "21" on the *c* scale until it intersects the line *e* leading from "3" on the *b* scale and from their intersection follow the line *d* to the division "7" on the *a* scale, which is the quotient of twenty-one and three. Squares and square roots are read directly on one line. Thus to find the square of six follow the diagonal line leading from "6" on either the *a* or *b* scale and it will lead to the division "36" on the *c* scale. Conversely, square roots are found by taking the number on the c scale and following the diagonal line therefrom to either the a or b scale.

To perform proportions, the rule is as follows: The second and fourth terms of the proportion are found in the c scale and the first and third in one of the other scales. If the first and second terms be taken on the a and c scales, respectively, the lines from the third and fourth terms will meet on the diagonal of the b scale extending from this intersection. Thus given the proportion 2:3::4:x, x is found as follows: Take "2" on the a scale and "3" on the c scale and from their intersection follow the diagonal e until it meets the diagonal from "4" on the a scale and from this intersection follow the vertical line f to the c scale and it will be found to lead to "6," which is the unknown term of the proportion.

Other computations will suggest themselves to those familiar with the use of the slide-rule.

It will be noted that each of the scales a, b, and c is divided into longitudinal bands or zones, whose divisions are decimal multiples of each other. Each of the a and b scales is shown as having three bands, the inner band reading from "1" to "10," the middle band from "10" to "100," and the outer band from "100" to "1,000." The c scale has five bands similarly increasing by a factor of ten. This enables me to obtain direct readings of any factors from one to one million by remembering a very simple rule, which is as follows: The combination of the two inner bands of the a and b scales is found on the inner band of the c scale. The combination of the two middle bands of the a and b scales is found on the middle band of the c scale. The combination of the two outer bands of the a and b scales is found on the outer band of the c scale. The combination of an inner with a middle band on the a and b scales is found on the second band of the c scale. The combination of an inner with an outer band on the a and b scales is found on the middle band of the c scale, and the combination of a middle band with an outer band on the a and b scales is found on the fourth band of the c scale. To further assist in remembering the above rule, the bands are preferably marked in two different shades or colors. Thus the first, third, and fifth bands may be colored white and the second and fourth bands red. Then the combination of any two bands of the same color in the a and b scales will give a white band in the c scale, and the combination of different colors in the a and b scales will give a red band in the c scale.

I claim—

1. A computing device comprising a plurality of primary logarithmic scales, a resultant logarithmic scale, intersecting lines leading from the divisions of the primary scales, and lines leading from the several intersections to the divisions of the resultant scale.

2. A computing device comprising two primary logarithmic scales and a resultant logarithmic scale forming a triangle, intersecting lines leading from the divisions of the primary scale, and lines leading from the several intersections to the divisions of the resultant scale.

3. A computing device comprising a plurality of primary logarithmic scales, a resultant logarithmic scale, each of said scales comprising longitudinal bands or zones whose divisions are designated in decimal multiples of each other, intersecting lines leading from the divisions of the primary scales, and lines leading from the several intersections to the divisions of the resultant scale.

4. A computing device comprising a plurality of primary logarithmic scales, a resultant logarithmic scale, each of said scales comprising longitudinal bands or zones of alternately contrasting shades or colors whose divisions are designated in decimal multiples of each other, intersecting lines leading from the divisions of the primary scales, and lines leading from the several intersections to the divisions of the resultant scale.

In testimony whereof I have affixed my signature in presence of two witnesses.

WILLIAM MAXWELL WHEILDON.

Witnesses:
ADELINE C. RATIGAN,
R. BULLOCK.